(12) United States Patent
Bar-Or Tillinger et al.

(10) Patent No.: US 12,368,532 B2
(45) Date of Patent: Jul. 22, 2025

(54) MIRS FOR UNLICENSED BANDS

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Assaf Touboul, Netanya (IL); Tal Oved, Modiin (IL)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/820,228

(22) Filed: Aug. 16, 2022

(65) Prior Publication Data

US 2024/0063948 A1    Feb. 22, 2024

(51) Int. Cl.
*H04L 1/1867* (2023.01)
*H04L 1/00* (2006.01)
*H04L 1/16* (2023.01)
*H04L 5/00* (2006.01)

(52) U.S. Cl.
CPC .............. *H04L 1/16* (2013.01); *H04L 1/0003* (2013.01); *H04L 1/0036* (2013.01); *H04L 5/0055* (2013.01)

(58) Field of Classification Search
CPC ......... H04L 1/16; H04L 1/003; H04L 1/0036; H04L 5/0055; H04L 1/1893
See application file for complete search history.

(56) References Cited

U.S. PATENT DOCUMENTS

| | | | |
|---|---|---|---|
| 11,581,984 B2 | 2/2023 | Kutz et al. | |
| 11,616,597 B1 | 3/2023 | Kutz et al. | |
| 11,792,792 B2 | 10/2023 | Oved et al. | |
| 11,909,474 B2 | 2/2024 | Kutz et al. | |
| 11,956,073 B2 | 4/2024 | Oved et al. | |
| 12,184,425 B2 | 12/2024 | Kutz et al. | |
| 2006/0133273 A1* | 6/2006 | Julian | H04L 47/323 370/462 |
| 2006/0136790 A1* | 6/2006 | Julian | H04L 1/20 714/704 |
| 2020/0350967 A1* | 11/2020 | Xu | H04B 7/022 |
| 2022/0368387 A1* | 11/2022 | Kutz | H04L 1/0618 |

(Continued)

FOREIGN PATENT DOCUMENTS

JP        2011517236        *    5/2011

OTHER PUBLICATIONS

3GPP TSG RAN WG1 Meeting#80bis, R1-151715 Title: Future CA enhancement to support PUCCH on SCell (Year: 2015).*

*Primary Examiner* — Faruk Hamza
*Assistant Examiner* — Abusayeed M Haque
(74) *Attorney, Agent, or Firm* — Procopio, Cory, Hargreaves & Savitch LLP

(57) ABSTRACT

A network node may identify a single first packet size associated with a plurality of packets. The network node may transmit the plurality of packets to a UE based on a MIRS. Each packet in the plurality of packets may be associated with the single first packet size. The UE may decode the plurality of packets based on the MIRS. Each packet in the plurality of packets may include a first number of systematic bits and a second number of parity bits. The first number of systematic bits may be associated with a first cyclic buffer at the network node. The second number of parity bits may be associated with a second cyclic buffer at the network node.

19 Claims, 12 Drawing Sheets

(56) References Cited

U.S. PATENT DOCUMENTS

| | | | |
|---|---|---|---|
| 2022/0376854 A1* | 11/2022 | Kutz | H04W 72/27 |
| 2023/0070440 A1* | 3/2023 | Frish | G01D 18/00 |
| 2023/0224092 A1 | 7/2023 | Kutz et al. | |
| 2023/0397188 A1 | 12/2023 | Bar-Or Tillinger et al. | |
| 2024/0259246 A1* | 8/2024 | Hamidi-Sepehr | H04L 27/26522 |

* cited by examiner

MIRS FOR UNLICENSED BANDS

TECHNICAL FIELD

The present disclosure relates generally to communication systems, and more particularly, to link adaptation in unlicensed bands in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive a plurality of packets from a network node. Each packet in the plurality of packets may be associated with a single first packet size. The apparatus may decode the plurality of packets based on a multiple incremental redundancy scheme (MIRS).

In an aspect of the disclosure, a method, a computer-readable medium, and an apparatus are provided. The apparatus may be a network node. The apparatus may identify a single first packet size associated with a plurality of packets. The apparatus may transmit the plurality of packets to a UE based on a MIRS. Each packet in the plurality of packets may be associated with the single first packet size.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
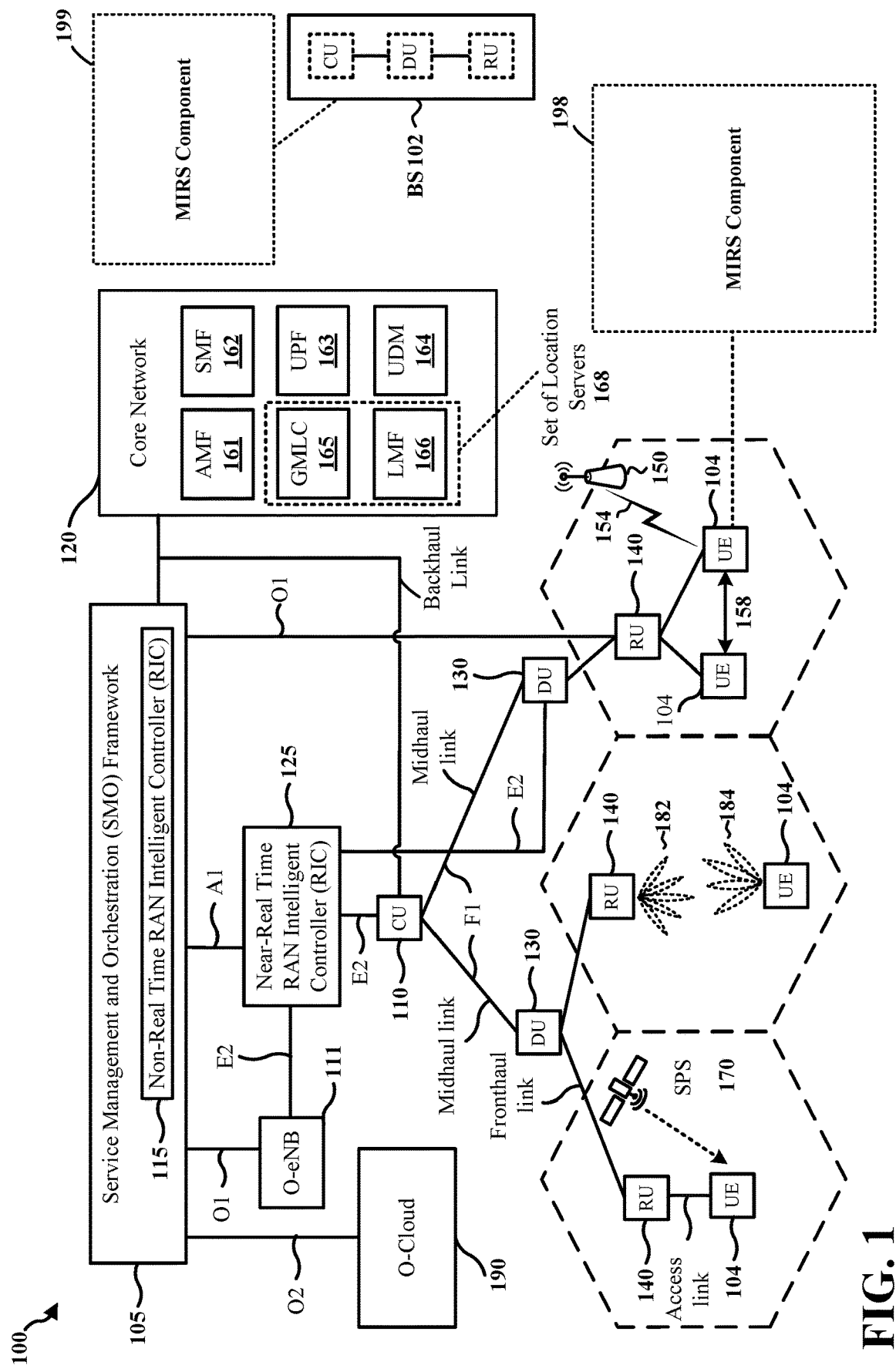
FIG. 1 is a diagram illustrating an example of a wireless communications system and an access network.

Because the link quality may be difficult or impossible to predict for unlicensed bands, channel state information (CSI)—reference signal (RS) (CSI-RS) based link adaptation may not be efficient for unlicensed bands. In some aspects, a network node may identify a single first packet size associated with a plurality of packets. The network node may transmit the plurality of packets to a UE based on a MIRS. Each packet in the plurality of packets may be associated with the single first packet size. The UE may decode the plurality of packets based on the MIRS. Accordingly, communication may be performed efficiently in unlicensed bands based on the MIRS technique.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a MIRS component 198 that may be configured to receive a plurality of packets from a network node. Each packet in the plurality of packets may be associated with a single first packet size. The MIRS component 198 may be configured to decode the plurality of packets based on a MIRS. In certain aspects, the base station 102 may include a MIRS component 199 that may be configured to identify a single first packet size associated with a plurality of packets. The MIRS component 199 may be configured to transmit the plurality of packets to a UE based on a MIRS. Each packet in the plurality of packets may be associated with the single first packet size. Although the following description may be focused on 5G NR, the concepts described herein may be applicable to other similar areas, such as LTE, LTE-A, CDMA, GSM, and other wireless technologies.

Figure 2:
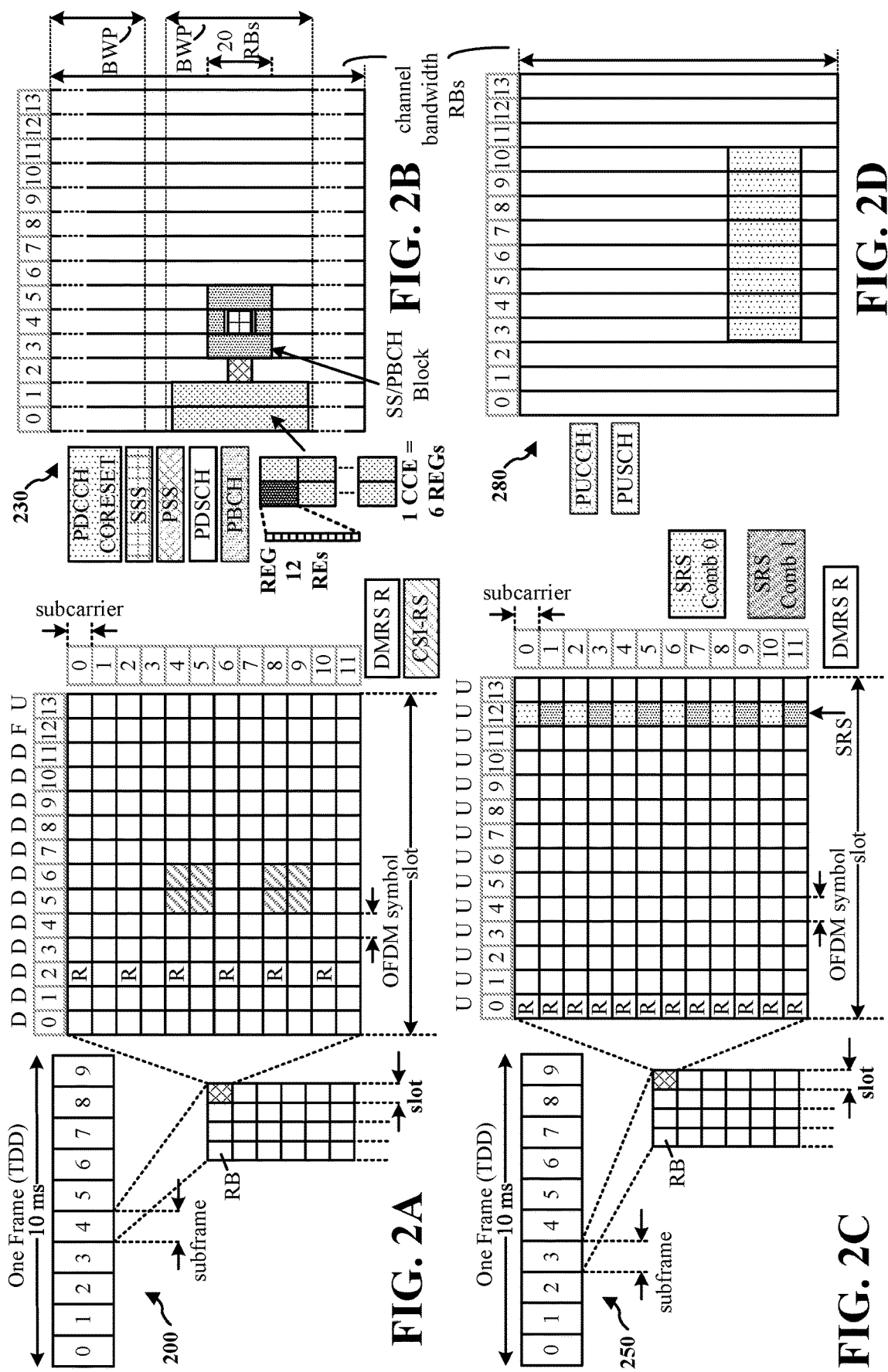
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA)

symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology p=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology p=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
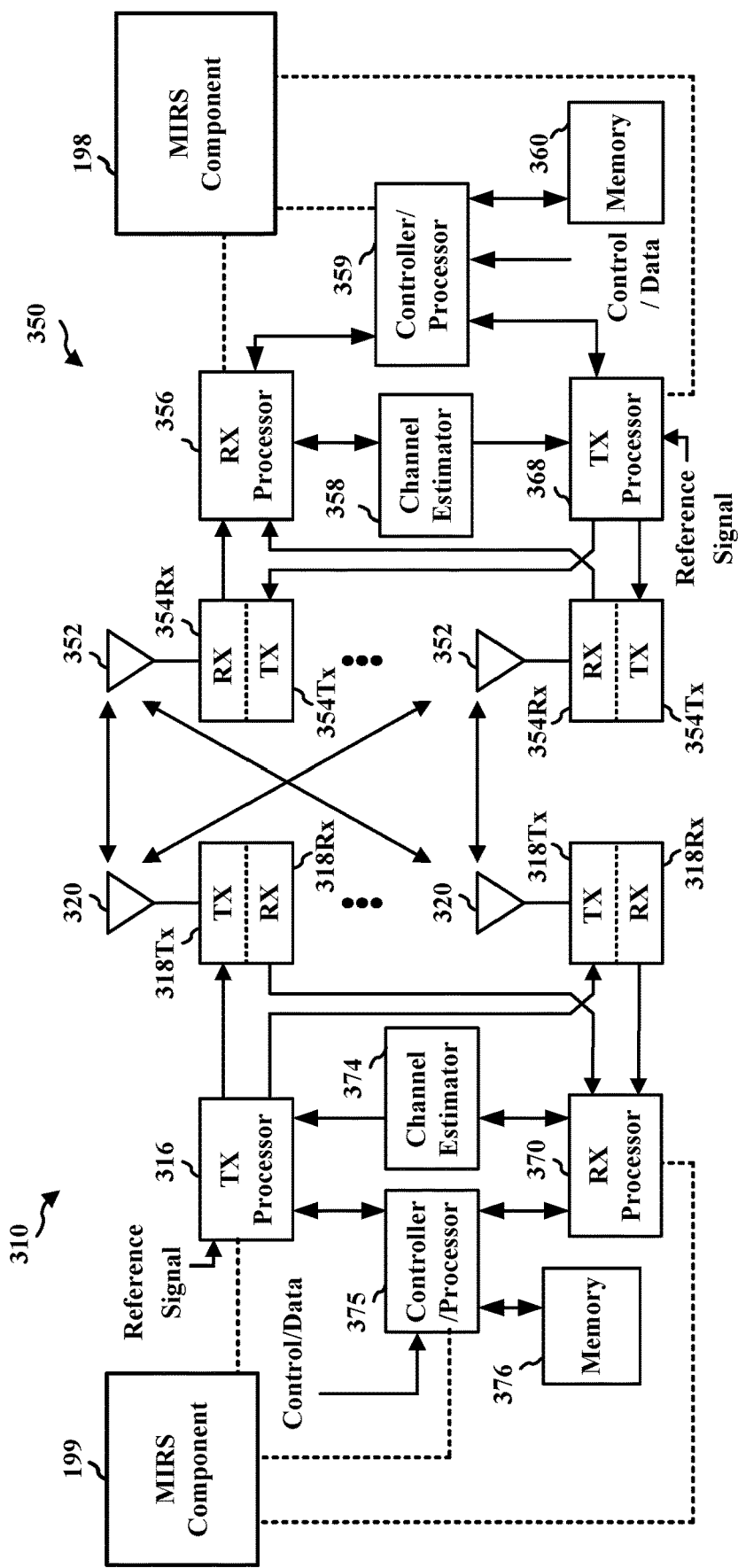
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the MIRS component 198 of FIG. 1.

At least one of the TX processor 316, the RX processor 370, and the controller/processor 375 may be configured to perform aspects in connection with the MIRS component 199 of FIG. 1.

The MIRS may be implemented to reduce or close the gap between the optimal link adaptation and the CSI-RS based link adaptation. The CSI-RS based link adaptation may be associated with certain drawbacks. For example, the CSI-RS based channel capacity tracking scheme may not adapt to the instantaneous optimal modulation and coding scheme (MCS) (the optimal MCS may be the highest MCS that may be decoded successfully on a specific transmission time interval (TTI)). In other words, the CSI-RS based link adaptation may not utilize the full available channel capacity.

The CSI-RS based channel capacity tracking scheme may not adapt to the instantaneous optimal MCS mainly because the CSI-RS based estimation may not be perfect, and often may not model the performance of the receiver performance accurately. In particular, for the CSI-RS based link adaptation, the channel state may be sampled at discrete times (e.g., at CSI-RS slots) and not continuously. Even if the transmitter and/or the receiver move at low velocities, the optimal MCS (and the optimal coding rate) may change significantly across the slots. However, for the CSI-RS based link adaptation, the used MCS (coding rate) may be set based on the first transmission and may not be dynamically adapted. Hereinafter a coding rate may also be referred to as a code rate. The coding/code rate may be a ratio between the number of information bits and the number of transmitted bits that may carry the information.

When the CSI-RS based link adaptation is used, if the first transmission fails, the transmitter may retransmit approximately the same number of coded bits. The retransmission scheme may have a small set of redundancy versions (RVs) that may be used to select the bits for retransmission. The bits for retransmission may be either the same coded bits as the first transmission (e.g., chase combining), which may result in a same code rate, or new coded bits (e.g., incremental redundancy), which may result in halving of the effective coding rate in the retransmission. As a result, the coding rate may be carefully selected for the first transmission because an overestimated coding rate (i.e., a coding rate greater than the most suitable/optimal coding rate) may result in decoding errors and may lead to throughput loss (reduction). On the other hand, an underestimated coding rate (i.e., a coding rate less than the most suitable/optimal coding rate) may also result in a loss (reduction) of throughput as a larger payload could have been transmitted successfully using a higher coding rate over the same channel resource.

Furthermore, outer loop link adaptation (OLLA) may be used for link adaptation between CSI-RS slots. However, the OLLA may not track the optimal MCS changes accurately.

As described above, the MIRS may reduce or close the gap between the optimal link adaptation (optimal MCS selection) and the CSI-RS based link adaptation so that communication at capacity code rate (e.g., the optimal code rate) may be achieved regardless of mobility.

For the MIRS, an overestimated MCS may be used at the beginning to ensure that throughput is not reduced due to an underestimated code rate. The MIRS may rely on extensive use of small sized retransmissions (e.g., incremental redundancy HARQ (IR-HARQ) retransmissions) for fine, dynamic adaptation of the coding rate based on the ACK/NACK feedback from the receiver. In other words, each time the receiver sends a NACK (alternatively, the NACK may be implied when the receiver does not send an ACK), the transmitter may transmit a small number of additional redundancy bits. In some configurations, per code block (CB) feedback may be used to further increase channel utilization.

In particular, for the MIRS, on the first transmission, the transmitter (e.g., a network node) may select an overoptimistic (overestimated) MCS. The first transmission based on the overoptimistic MCS may be expected to fail (i.e., the receiver may not be expected to successfully decode the first transmission) in most cases. The MCS selection for the first transmission may determine the coding parameters (e.g., code rate, transport block size (TBS), etc.) for all the following retransmissions.

For each decoding failure, the receiver may send a feedback (e.g., a NACK feedback) with per CB decoding results. In some configurations, the receiver may convey additional information to enable a faster convergence to the actual acceptable rate at the transmitter. Accordingly, for each decoding failure, the transmitter may schedule and send additional bits for each failing transport block (TB) (or for each failing CB), where the additional bits may be selected from the initial coded bits buffer of the CBs.

The added bits in each retransmission may reduce the effective rate of each CB in fine steps until all CBs (and therefore the whole TB) are decoded successfully. Therefore, the total number of bits sent over the first transmission and the subsequent retransmissions may determine the actual used rate for each TB.

Figure 4:
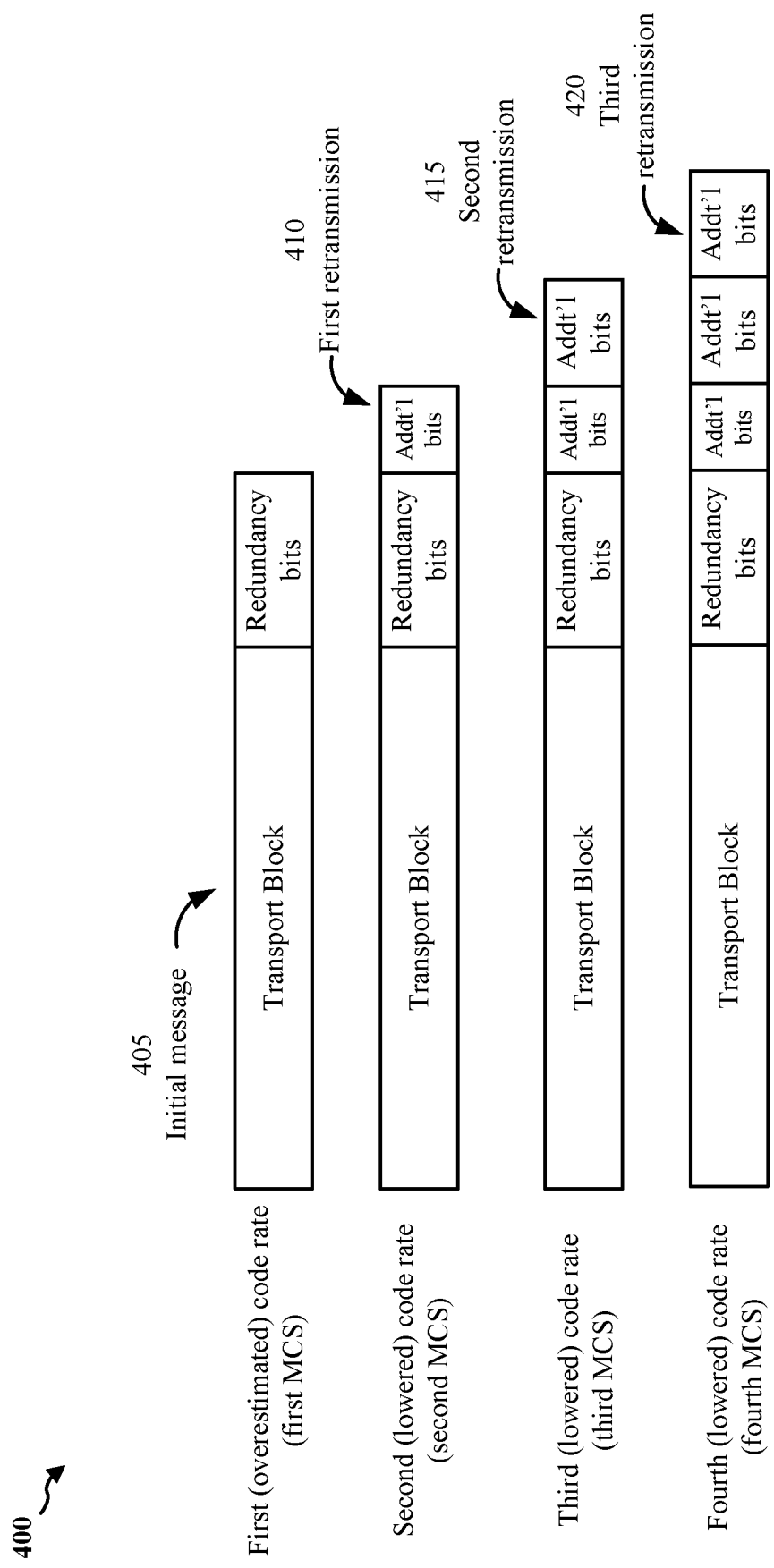
FIG. 4 is a diagram illustrating an example associated with a MIRS, in accordance with one or more aspects of the present disclosure.

FIG. 4 is a diagram illustrating an example 400 associated with a MIRS, in accordance with one or more aspects of the present disclosure. FIG. 4 depicts an initial message 405 and retransmissions 410, 415, and 420 of a communication. For example, the communication may be transmitted by a transmitter device, such as a network node (e.g., the network node 604 in FIG. 6) or a UE. The communication may be received by a receiver device such as a UE (e.g., the UE 602 in FIG. 6) or a network node.

For example, as shown in FIG. 4, the initial message 405 may include a TB that includes a payload (e.g., information bits or systematic bits) and one or more redundancy (parity) bits. The initial transmission may use a first code rate and/or a first MCS. The first code rate and/or the first MCS may be overestimated (e.g., for the channel) and/or may be a highest available or configured code rate and/or MCS.

The first retransmission 410 may include a number of additional coded bits (e.g., from a set of bits associated with the TB). For example, a receiver device may be unable to successfully decode the TB using the initial message 405. Therefore, the transmitter device may schedule and/or transmit the first retransmission 410 to incrementally and effectively lower the code rate and/or the MCS for the communication. The number of additional coded bits included in the first retransmission 410 may lower the effective code rate and/or MCS for the communication to a second code rate and/or a second MCS.

The second retransmission 415 may include a number of additional coded bits (e.g., from the set of bits associated with the TB). For example, a receiver device may be unable to successfully decode the TB using the initial message 405 and the first retransmission 410. Therefore, the transmitter device may schedule and/or transmit the second retransmission 415 to incrementally and effectively lower the code rate and/or the MCS for the communication. The number of additional coded bits included in the second retransmission 415 may lower the effective code rate and/or the MCS for the communication to a third code rate and/or a third MCS.

The third retransmission 420 may include a number of additional coded bits (e.g., from the set of bits associated with the TB). For example, a receiver device may be unable to successfully decode the transport block using the initial message 405, the first retransmission 410, and the second retransmission 415. Therefore, the transmitter device may schedule and/or transmit the third retransmission 420 to incrementally and effectively lower the code rate and/or the MCS for the communication. The number of additional coded bits included in the third retransmission 420 may lower the effective code rate and/or the MCS for the communication to a third code rate and/or a third MCS.

As a result, the transmitter device may be enabled to incrementally lower the effective code rate for the communication using the small sized retransmissions 410, 415, and 420. For example, if the receiver device is enabled to successfully decode the communication (e.g., the entire TB) after the transmission of the third retransmission, then the effective code rate for the communication (e.g., for the TB) may be based at least in part on the number of coded bits transmitted in the initial message 405, the first retransmission 410, the second retransmission 415, and the third retransmission 420. It should be appreciated that the number of retransmissions illustrated in FIG. 4 is illustrative and does not limit the disclosure. The transmitter device may transmit fewer than or more than 3 retransmissions in order for the receiver device to successfully decode the whole communication. The transmitter device may continue to provide retransmission(s) until the receiver device has successfully decoded the whole communication (e.g., when the cyclic redundancy check (CRC) passes). As such, the transmitter device may cease further retransmissions upon receiving an ACK feedback from the receiver device, where the ACK feedback may indicate that the receiver device has successfully decoded the communication.

The initial message 405, the first retransmission 410, the second retransmission 415, and the third retransmission 420 may be transmitted in different time windows (e.g., in different slots). For example, the transmitter device may transmit the initial message 405 in a first slot. The transmitter device may transmit the first retransmission 410 in a second slot (e.g., may transmit the additional bits for the first retransmission 410 indicated in FIG. 4 in the second slot). The transmitter device may transmit the second retransmission 415 in a third slot (e.g., may transmit the additional bits for the second retransmission 415 indicated in FIG. 4 in the third slot). The transmitter device may transmit the third retransmission 420 in a fourth slot (e.g., may transmit the additional bits for the third retransmission 420 indicated in FIG. 4 in the fourth slot). As the retransmissions 410, 415, and/or 420 may be small sized retransmissions, the transmitter device may be enabled to transmit multiple retransmissions for different TBs in the same slot. For example, in the second slot, the transmitter device may transmit the first retransmission 410 and a different retransmission for a different TB (not shown in FIG. 4).

The MIRS may be suitable for unlicensed bands where interference may be random and hard to predict. Because the link quality is difficult or impossible to predict, CSI-RS based link adaptation may not be efficient for unlicensed bands. The MIRS may not rely on the CSI-RS and may achieve a communication throughput close to that allowed by the channel capacity limit regardless of the randomness of the interference.

To use the MIRS in unlicensed bands, in some configurations, rate-less communication may be implemented, where all packets (transmissions) may be of an equal size (and equal importance).

For the MIRS described in relation to FIG. 4, the first transmission may have a large size. In particular, the size of the first transmission may match the starting code rate (based on, e.g., rough link adaptation with overestimation). The effective coding rate of the first transmission may be at least 1 (or lower) (the first transmission may have a coding rate lower than 1 if the first transmission includes redundancy). Further, subsequent retransmissions may be of smaller sizes. Each subsequent retransmission may add a small amount of incremental redundancy. Therefore, for the MIRS described in relation to FIG. 4, loss of the first packet (transmission) may be difficult to recover from.

In one configuration, to improve resiliency to random interference in unlicensed bands, all transmissions (including the initial transmission(s) and subsequent retransmissions) of a communication (e.g., a TB) may be of an equal size (and equal importance). Therefore, instead of transmitting the whole communication using an overoptimistic MCS in a single large initial transmission (e.g., as is done with the initial message 405 in FIG. 4), initially, the transmitter device may transmit multiple smaller equal-sized transmissions (e.g., over multiple slots) with an overoptimistic MCS, where the whole communication may be divided up and transmitted in these multiple equal-sized small initial transmissions. For example, if a communication (e.g., a TB) includes n bits and initial transmissions include 8 transmissions, each initial transmission may include $\frac{1}{8}*n$ bits. Accordingly, the code rate after the first single transmission may be higher than 1. Thereafter, each of the retransmissions (e.g., corresponding to the first retransmission 410, the second retransmission 415, the third retransmission 420, etc.) may be equal in size to each of the initial transmissions (e.g., $\frac{1}{8}*n$ bits in the example above). Because all transmissions are of an equal size and equal importance, it may be easier to recover from loss of any transmission (e.g., the initial transmission(s) or any of the subsequent retransmissions) due to interference.

In some configurations, the transmitter device may select a suitable transmission size (which may be used for all transmissions including the initial transmission(s) and the subsequent retransmission(s), if any, as descried above) that helps to achieve a proper balance between latency and the quality of MIRS based rate adaptation. It should be appreciated that the quality of rate adaptation may increase as smaller transmission sizes are used. The smaller transmission sizes may also help to improve the resiliency to random interference. However, on the other hand, latency may increase as well (which may not be desirable) as the transmission size decreases.

In some configurations, all transmissions for the communication (e.g., the TB) may include a same mixture (same portions) of systematic/information and parity/redundancy bits so that all transmissions may have equal importance. For example, in each transmission (the initial transmission(s) or any of the subsequent retransmissions), x % of the bits may be systematic/information bits and (100–x) % of the bits may be parity/redundancy bits. Accordingly, for rate matching, the transmitter device may include two cyclic buffers—one for systematic/information bits and the other for parity/redundancy bits. For each transmission (the initial transmission(s) or any of the subsequent retransmissions), the transmitter device may select a first number of bits from the cyclic buffer for systematic/information bits and a second number of bits from the cyclic buffer for parity/redundancy bits. As all transmissions for the communication (e.g., the TB) may include the same mixture of systematic/information and parity/redundancy bits, the first number and the second number may be constant through all transmissions (including the initial transmission(s) and the subsequent retransmissions).

In some configurations, when strong interference (e.g., interference greater than a threshold) is identified, the transmitter device (e.g., a network node) may transmit a repetition of a slot or a CB. The receiver device (e.g., a UE) may notify the transmitter device about the strong interference when the receiver device detects or measures a drop in the reception quality (e.g., the drop may be greater than a threshold). In particular, the receiver device may detect the drop in the reception quality based on one or more metrics including a signal-to-noise ratio (SNR), a channel capacity, an average log-likelihood ratio (LLR), or a mutual information (which may be identified based on the average LLR).

Figure 5:
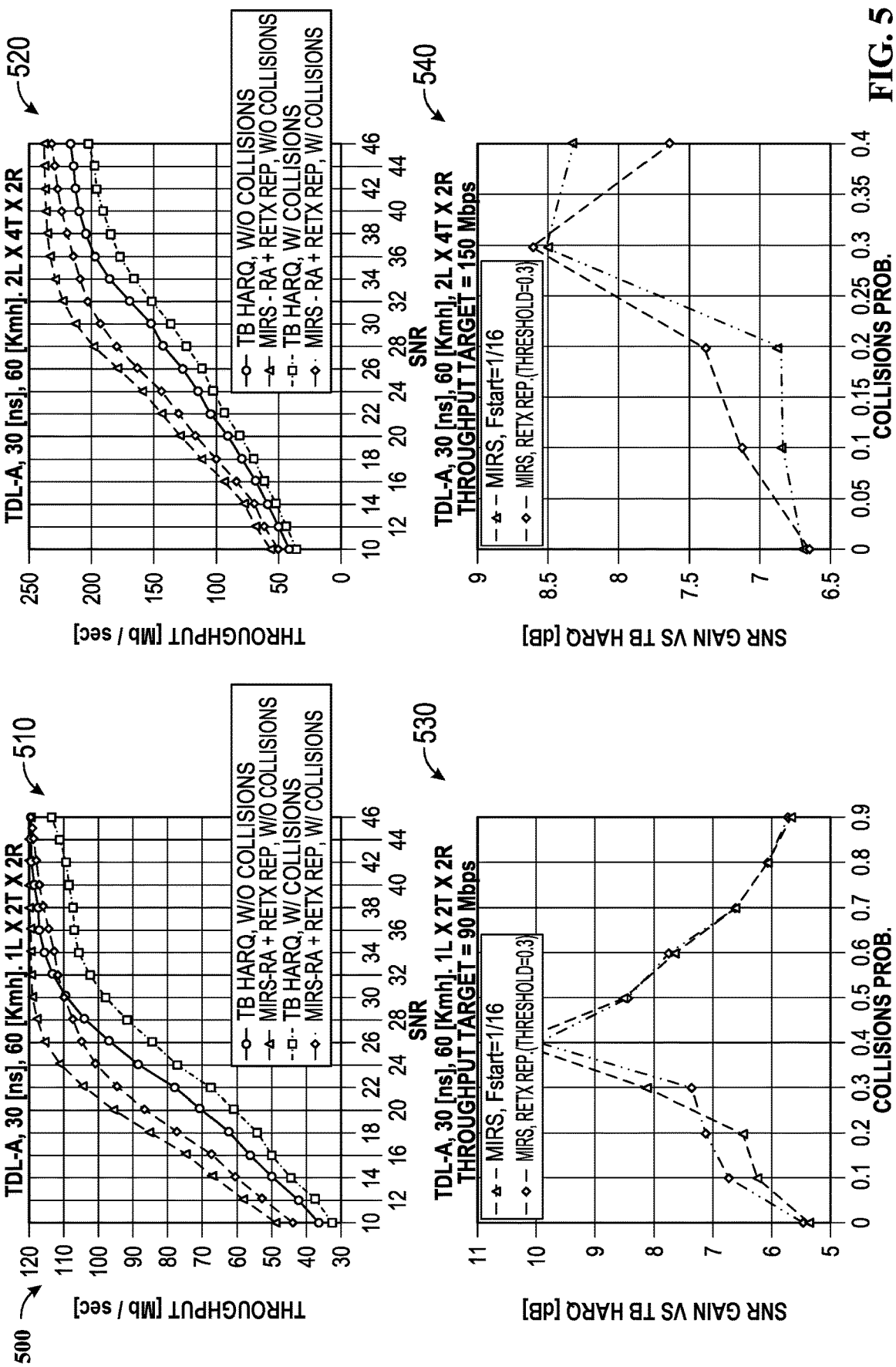
FIG. 5 is a diagram illustrating various simulation results associated with example rate-less communication based on the MIRS.

FIG. 5 is a diagram 500 illustrating various simulation results associated with example rate-less communication based on the MIRS. In the simulation, a collision event may be assumed to reduce the average SNR by 20 dB. As shown, diagrams 510 and 520 illustrate the throughput in relation to the SNR for the TB based HARQ and for the MIRS, without collisions and with collisions at a probability of 10%, where the diagram 510 illustrates the results for a single layer configuration and the diagram 520 illustrates the results for a 2-layer configuration.

Further, diagrams 530 and 540 illustrate performance gains associated with the MIRS for a given throughput as a function of the collision probability. In particular, the results are shown where all transmissions are of an equal size and equal importance (e.g., each transmission may be $\frac{1}{16}$ of the TB based HARQ size). Further, results are shown where repetitions of slots are sent where strong interference is detected (e.g., LLR based mutual information is below 0.3).

As can be seen in FIG. 5, the MIRS is associated with higher gains than the conventional HARQ scheme. Further, the gains may significantly increase in an environment with random interference.

Because the MIRS is based on extensive use of the ACK/NACK feedback, the transmitter device (e.g., a network node) may learn the interference based on statistics associated with the ACK/NACK feedback. For example, receiving excessive NACK feedbacks while the transmitter device is transmitting in a particular frequency band may indicate that there may be a source causing significant interference (e.g., a Wi-Fi station) operating in the same band.

Accordingly, the transmitter device may hop (switch) between frequency bands (e.g., a hop every few ms) to learn the environment. For example, the transmitter device may sweep through usable frequency bands (e.g., unlicensed bands) to learn the environment. In particular, the transmitter device may learn the level of interference in each usable frequency band based on statistics associated with NACK feedbacks. For example, more frequent NACK feedbacks in a frequency band may indicate a higher level of interference in the frequency band. A higher level of interference in a frequency band may be associated with a lower communication performance in the frequency band. To learn the environment, the transmitter device may keep track of statistics associated with NACK feedbacks per frequency band over a predefined time window.

Then, based on the knowledge about the levels of interference in different usable frequency bands, the transmitter device may identify a new frequency hopping scheme (e.g., a pattern of switching between the frequency bands) to hop with higher probabilities to frequency bands (segments) associated with better average performance (e.g., lower levels of interference). Accordingly, the transmitter device may significantly reduce the likelihood that a transmission may be subject to interference from such sources as active Wi-Fi stations.

In some configurations, the transmitter device may hop to all usable frequency bands with non-zero probabilities even if some frequency bands may have significant interference so that all usable frequency bands may be monitored over time. Accordingly, the transmitter device may adaptively update the frequency hopping scheme based on new knowledge about the levels of interference in different usable frequency bands. The adaptive updating of the frequency hopping scheme may be beneficial because some sources of interference (e.g., Wi-Fi stations) may be switched on or off over time.

Figure 6:
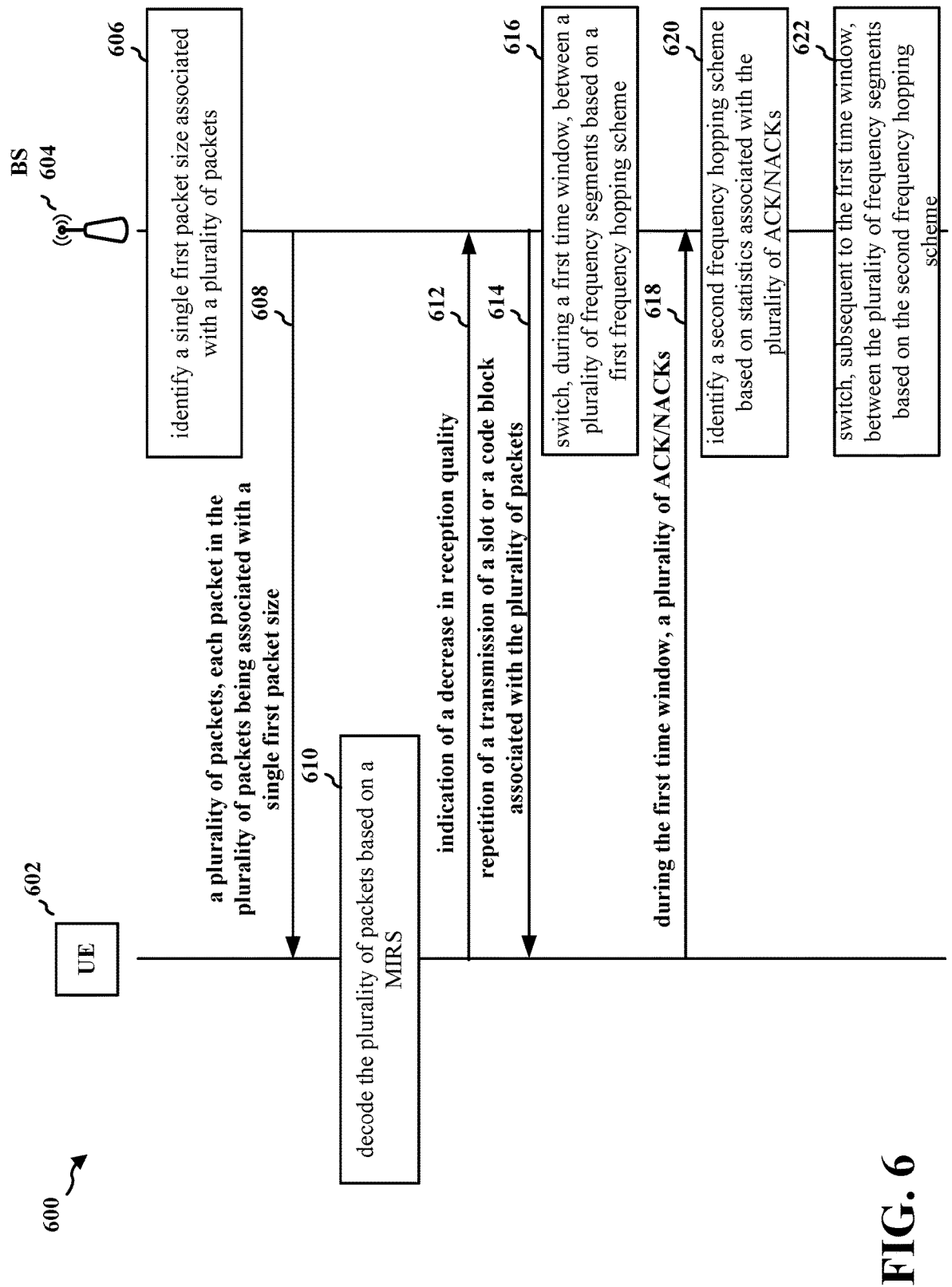
FIG. 6 is a diagram of a communication flow of a method of wireless communication.

FIG. 6 is a diagram of a communication flow 600 of a method of wireless communication. Although the UE 602 serves as the receiver device and the network node 604 serves as the transmitter device in the example illustrated in FIG. 6, the disclosure is not so limited. In other configurations, the receiver device may be a device other than a UE (e.g., a network node or a device of some other type) and the transmitter device may be a device other than a network node (e.g., a UE or a device of some other type).

At 606, the network node 604 may identify a single first packet size (transmission size/message size) associated with a plurality of packets (transmissions/messages).

At 608, the network node 604 may transmit the plurality of packets to a UE 602 based on a MIRS. Each packet in the plurality of packets may be associated with a single first packet size.

In one configuration, each packet in the plurality of packets may include a first number of systematic bits and a second number of parity bits.

In one configuration, the first number of systematic bits may be associated with a first cyclic buffer at the network node 604. The second number of parity bits may be associated with a second cyclic buffer at the network node 604.

In one configuration, the plurality of packets may be associated with an (effective) code rate.

In one configuration, the plurality of packets may be associated with a communication (e.g., a TB).

At 610, the UE 602 may decode the plurality of packets based on the MIRS.

At 612, the UE 602 may transmit an indication of a decrease in reception quality to the network node 604.

In one configuration, the UE 602 may identify the decrease in the reception quality based on at least one of an SNR, a channel capacity, an average LLR, or a mutual information.

At 614, the network node 604 may transmit a repetition of a transmission of a slot or a code block associated with the plurality of packets to the UE 602 based on the decrease in the reception quality.

At 616, the network node 604 may switch, during a first time window, between a plurality of frequency segments for transmission to the UE 602 based on a first frequency hopping scheme.

At 618, the network node 604 may receive, during the first time window, a plurality of ACK/NACKs from the UE 602.

At 620, the network node 604 may identify a second frequency hopping scheme based on statistics associated with the plurality of ACK/NACKs.

At 622, the network node 604 may switch, subsequent to the first time window, between the plurality of frequency segments for transmission to the UE 602 based on the second frequency hopping scheme.

Figure 7:
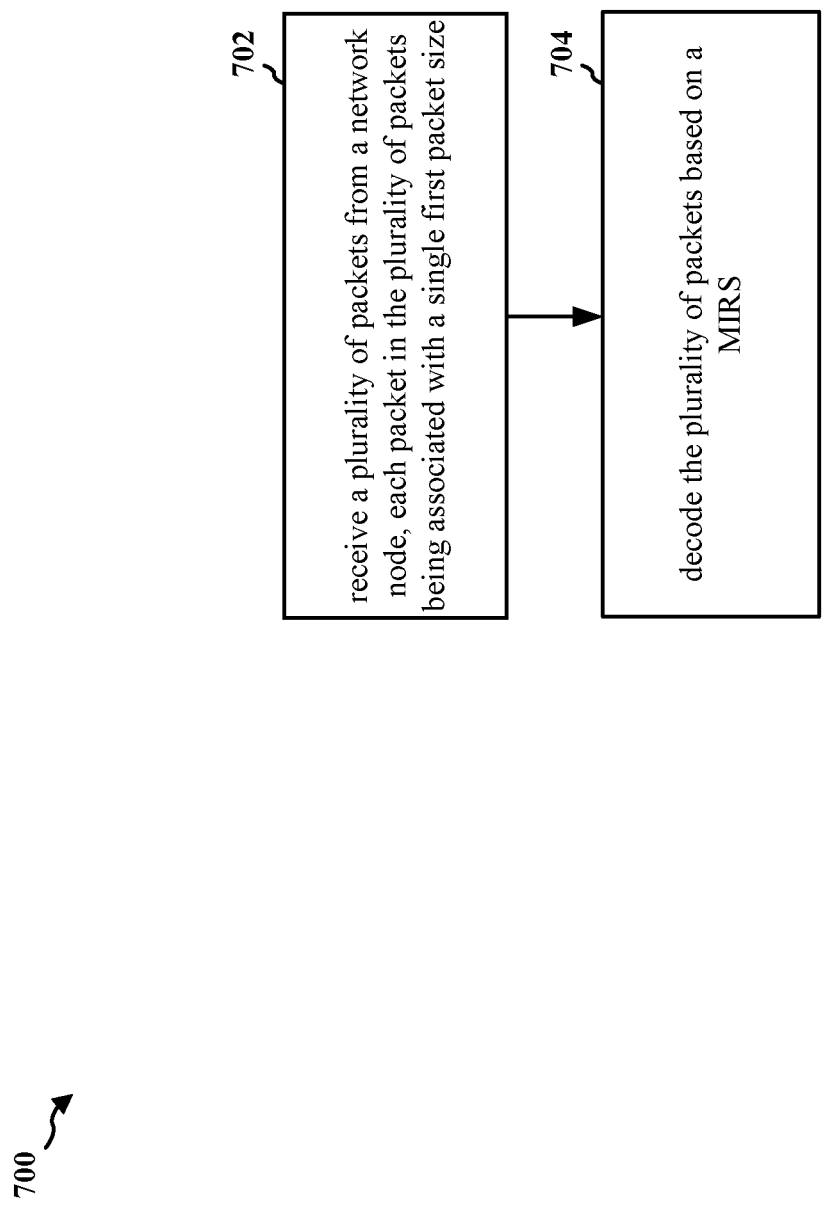
FIG. 7 is a flowchart of a method of wireless communication.

FIG. 7 is a flowchart 700 of a method of wireless communication. The method may be performed by a UE (e.g., the UE 104/350/602; the apparatus 1104). At 702, the UE may receive a plurality of packets from a network node. Each packet in the plurality of packets may be associated with a single first packet size. For example, 702 may be performed by the component 198 in FIG. 11. Referring to FIG. 6, at 608, the UE 602 may receive a plurality of packets from a network node 604.

At 704, the UE may decode the plurality of packets based on a MIRS. For example, 704 may be performed by the component 198 in FIG. 11. Referring to FIG. 6, at 610, the UE 602 may decode the plurality of packets based on a MIRS.

Figure 8:
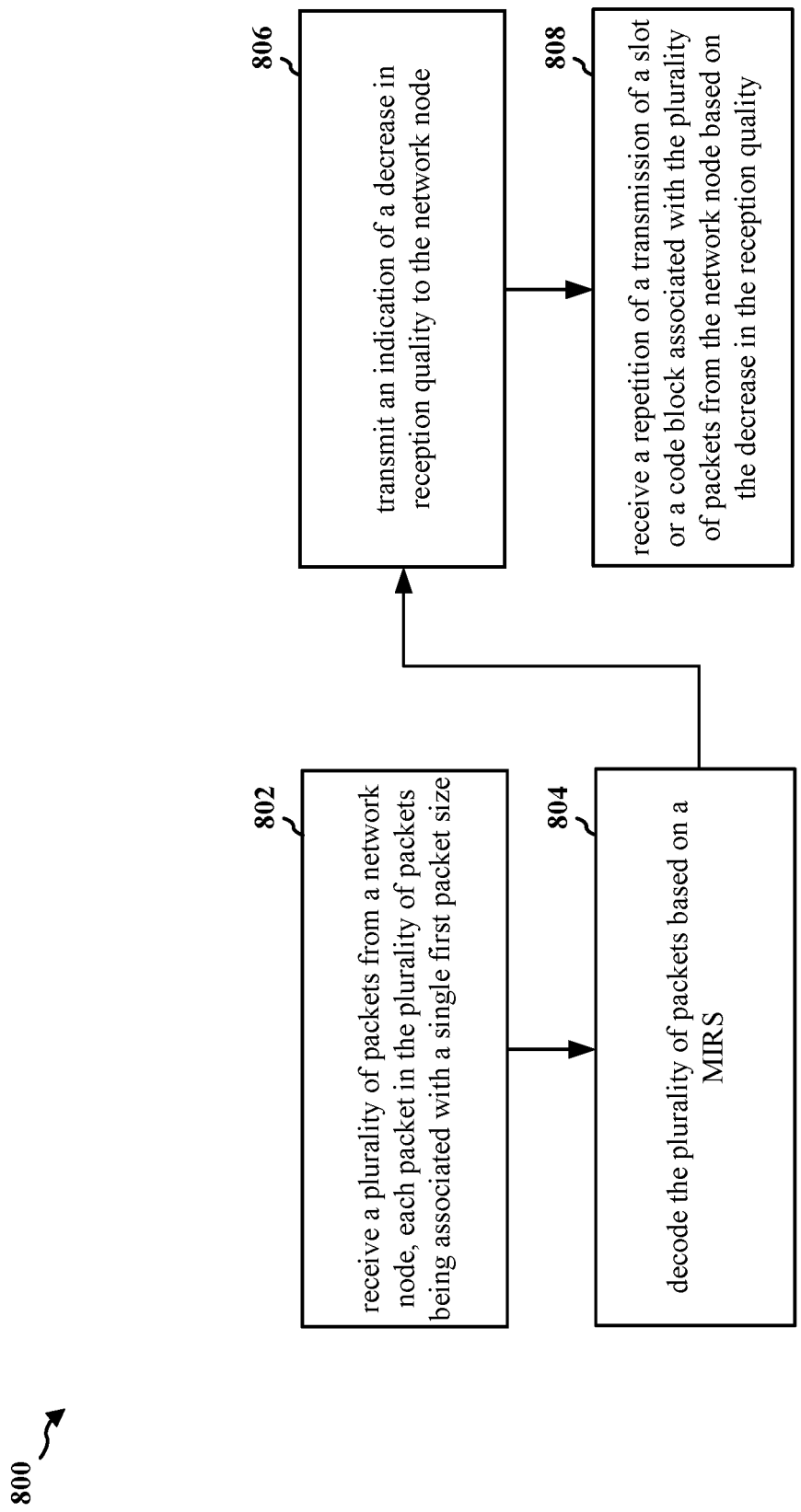
FIG. 8 is a flowchart of a method of wireless communication.

FIG. 8 is a flowchart 800 of a method of wireless communication. The method may be performed by a UE (e.g., the UE 104/350/602; the apparatus 1104). At 802, the UE may receive a plurality of packets from a network node. Each packet in the plurality of packets may be associated with a single first packet size. For example, 802 may be performed by the component 198 in FIG. 11. Referring to FIG. 6, at 608, the UE 602 may receive a plurality of packets from a network node 604.

At 804, the UE may decode the plurality of packets based on a MIRS. For example, 804 may be performed by the component 198 in FIG. 11. Referring to FIG. 6, at 610, the UE 602 may decode the plurality of packets based on a MIRS.

In one configuration, referring to FIG. 6, each packet in the plurality of packets 608 may include a first number of systematic bits and a second number of parity bits.

In one configuration, referring to FIG. 6, the first number of systematic bits may be associated with a first cyclic buffer at the network node 604. The second number of parity bits may be associated with a second cyclic buffer at the network node 604.

In one configuration, at 806, the UE may transmit an indication of a decrease in reception quality to the network node. For example, 806 may be performed by the component 198 in FIG. 11. Referring to FIG. 6, at 612, the UE 602 may transmit an indication of a decrease in reception quality to the network node 604.

At 808, the UE may receive a repetition of a transmission of a slot or a code block associated with the plurality of packets from the network node based on the decrease in the reception quality. For example, 808 may be performed by the component 198 in FIG. 11. Referring to FIG. 6, at 614, the UE 602 may receive a repetition of a transmission of a slot or a code block associated with the plurality of packets from the network node 604 based on the decrease in the reception quality.

In one configuration, the decrease in the reception quality may be identified based on at least one of an SNR, a channel capacity, an average LLR, or a mutual information.

In one configuration, referring to FIG. 6, the plurality of packets 608 may be associated with a code rate.

Figure 9:
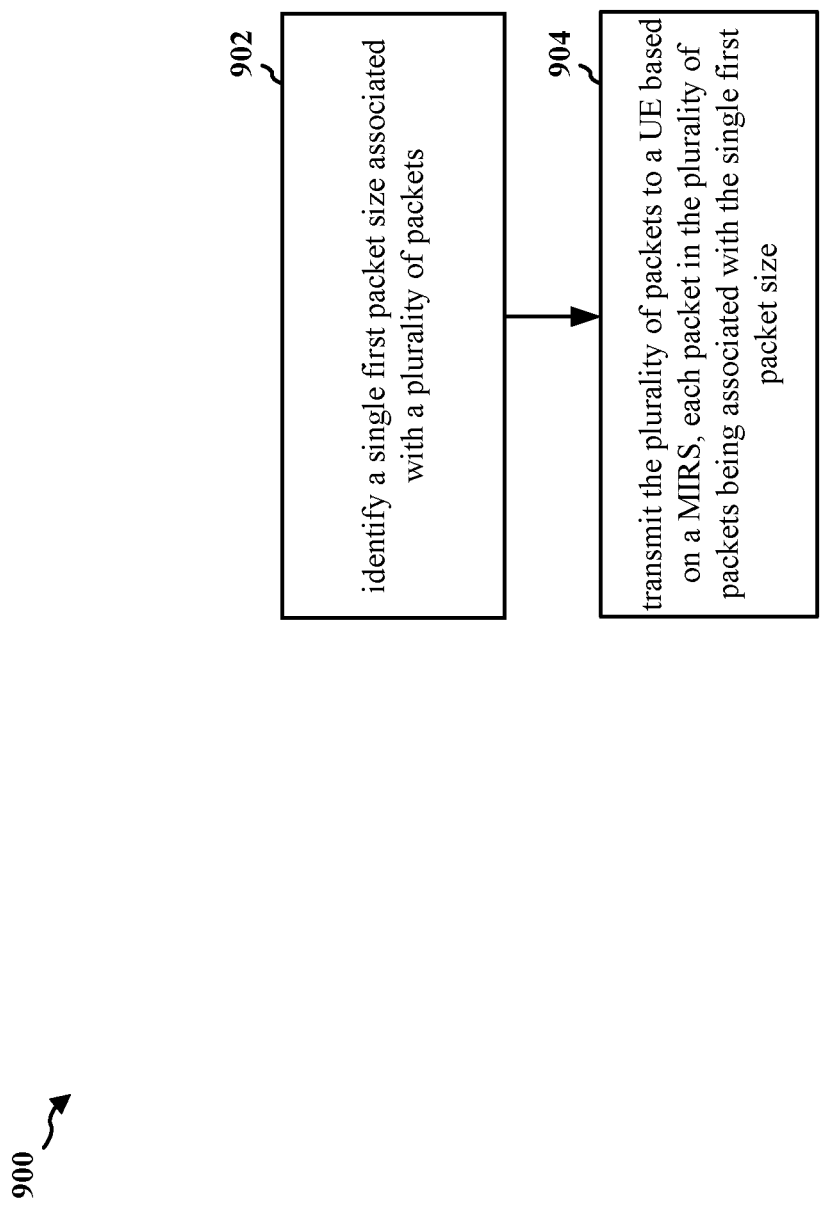
FIG. 9 is a flowchart of a method of wireless communication.

FIG. 9 is a flowchart 900 of a method of wireless communication. The method may be performed by a network node/base station (e.g., the base station 102/310/604; the network entity 1102). At 902, the network node may identify a single first packet size associated with a plurality of packets. For example, 902 may be performed by the component 199 in FIG. 11. Referring to FIG. 6, at 606, the network node 604 may identify a single first packet size associated with a plurality of packets.

At 904, the network node may transmit the plurality of packets to a UE based on a MIRS. Each packet in the plurality of packets may be associated with the single first packet size. For example, 904 may be performed by the component 199 in FIG. 11. Referring to FIG. 6, at 608, the network node 604 may transmit the plurality of packets to a UE 602 based on a MIRS.

Figure 10:
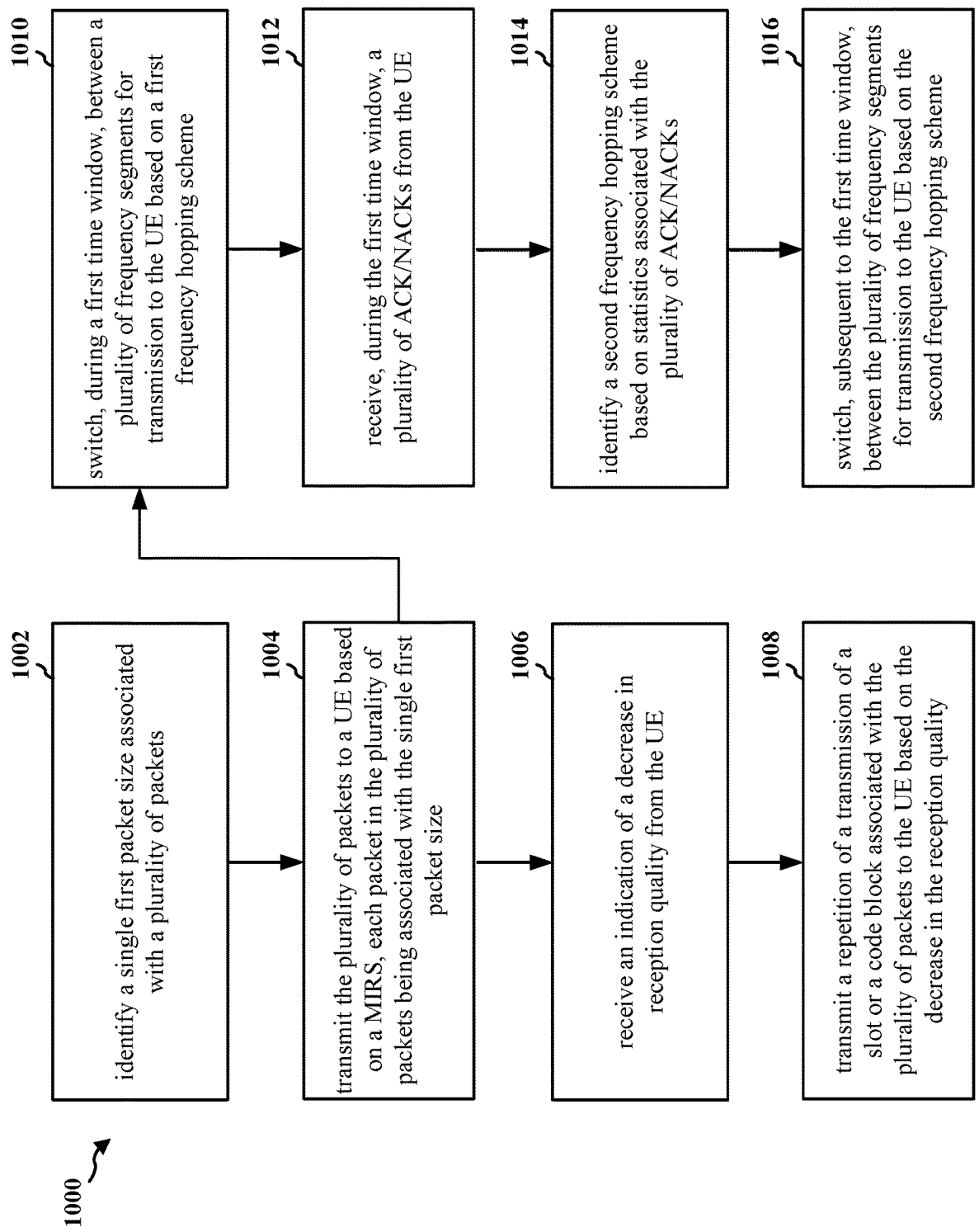
FIG. 10 is a flowchart of a method of wireless communication.

FIG. 10 is a flowchart 1000 of a method of wireless communication. The method may be performed by a network node/base station (e.g., the base station 102/310/604; the network entity 1102). At 1002, the network node may identify a single first packet size associated with a plurality of packets. For example, 1002 may be performed by the component 199 in FIG. 11. Referring to FIG. 6, at 606, the network node 604 may identify a single first packet size associated with a plurality of packets.

At 1004, the network node may transmit the plurality of packets to a UE based on a MIRS. Each packet in the plurality of packets may be associated with the single first packet size. For example, 1004 may be performed by the component 199 in FIG. 11. Referring to FIG. 6, at 608, the network node 604 may transmit the plurality of packets to a UE 602 based on a MIRS.

In one configuration, referring to FIG. 6, each packet in the plurality of packets 608 may include a first number of systematic bits and a second number of parity bits.

In one configuration, referring to FIG. 6, the first number of systematic bits may be associated with a first cyclic buffer at the network node 604. The second number of parity bits may be associated with a second cyclic buffer at the network node 604.

In one configuration, at 1006, the network node may receive an indication of a decrease in reception quality from the UE. For example, 1006 may be performed by the component 199 in FIG. 11. Referring to FIG. 6, at 612, the network node 604 may receive an indication of a decrease in reception quality from the UE 602.

At 1008, the network node may transmit a repetition of a transmission of a slot or a code block associated with the plurality of packets to the UE based on the decrease in the reception quality. For example, 1008 may be performed by the component 199 in FIG. 11. Referring to FIG. 6, at 614, the network node 604 may transmit a repetition of a transmission of a slot or a code block associated with the plurality of packets to the UE 602 based on the decrease in the reception quality.

In one configuration, the decrease in the reception quality may be based on at least one of an SNR, a channel capacity, an average LLR, or a mutual information.

In one configuration, at 1010, the network node may switch, during a first time window, between a plurality of frequency segments for transmission to the UE based on a first frequency hopping scheme. For example, 1010 may be performed by the component 199 in FIG. 11. Referring to FIG. 6, at 616, the network node 604 may switch, during a first time window, between a plurality of frequency segments for transmission to the UE 602 based on a first frequency hopping scheme.

At 1012, the network node may receive, during the first time window, a plurality of ACK/NACKs from the UE. For example, 1012 may be performed by the component 199 in FIG. 11. Referring to FIG. 6, at 618, the network node 604 may receive, during the first time window, a plurality of ACK/NACKs from the UE 602.

At 1014, the network node may identify a second frequency hopping scheme based on statistics associated with the plurality of ACK/NACKs. For example, 1014 may be performed by the component 199 in FIG. 11. Referring to FIG. 6, at 620, the network node 604 may identify a second frequency hopping scheme based on statistics associated with the plurality of ACK/NACKs.

At 1016, the network node may switch, subsequent to the first time window, between the plurality of frequency segments for transmission to the UE based on the second frequency hopping scheme. For example, 1016 may be performed by the component 199 in FIG. 11. Referring to FIG. 6, at 622, the network node 604 may switch, subsequent to the first time window, between the plurality of frequency segments for transmission to the UE 602 based on the second frequency hopping scheme.

In one configuration, a frequency segment in the plurality of frequency segments may be switched to with a higher probability based on the second frequency hopping scheme if the frequency segment is less likely to be associated with NACKs based on the statistics associated with the plurality of ACK/NACKs.

In one configuration, referring to FIG. 6, the plurality of packets 608 may be associated with a code rate.

Figure 11:
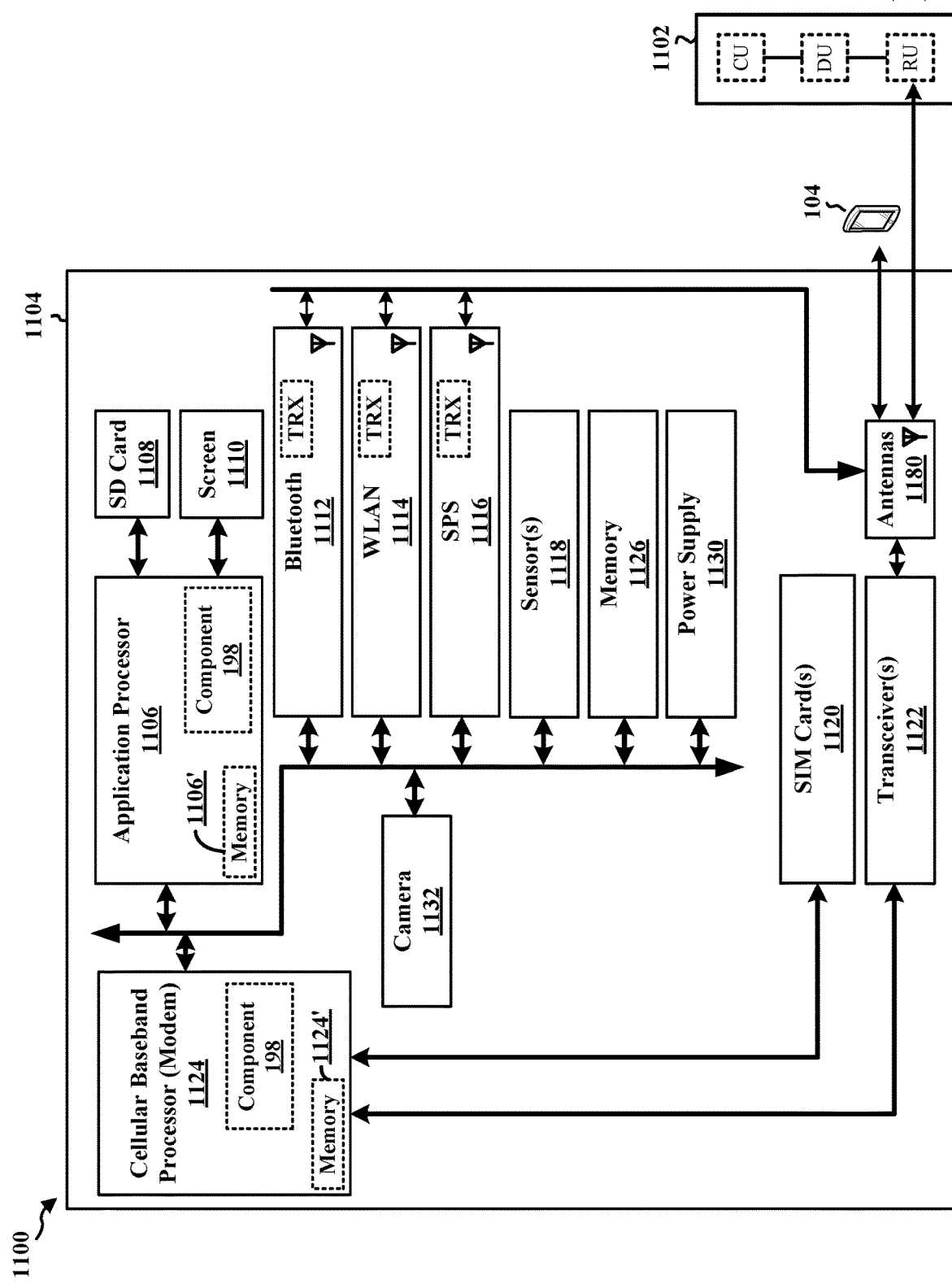
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 is configured to receive a plurality of packets from a network node. Each packet in the plurality of packets may be associated with a single first packet size. The component 198 may be configured to decode the plurality of packets based on a MIRS. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for receiving a plurality of packets from a network node. Each packet in the plurality of packets may be associated with a single first packet size. The apparatus 1104, and in particular the cellular baseband processor 1124 and/or the application processor 1106, includes means for decoding the plurality of packets based on a MIRS.

In one configuration, each packet in the plurality of packets may include a first number of systematic bits and a second number of parity bits. In one configuration, the first number of systematic bits may be associated with a first cyclic buffer at the network node. The second number of parity bits may be associated with a second cyclic buffer at the network node. In one configuration, the apparatus 1104, and in particular the cellular baseband processor 1124 and/or the application processor 1106, includes means for transmitting an indication of a decrease in reception quality to the network node. The apparatus 1104, and in particular the cellular baseband processor 1124 and/or the application processor 1106, includes means for receiving a repetition of a transmission of a slot or a code block associated with the plurality of packets from the network node based on the decrease in the reception quality. In one configuration, the decrease in the reception quality may be identified based on at least one of an SNR, a channel capacity, an average LLR, or a mutual information. In one configuration, the plurality of packets may be associated with a code rate.

The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
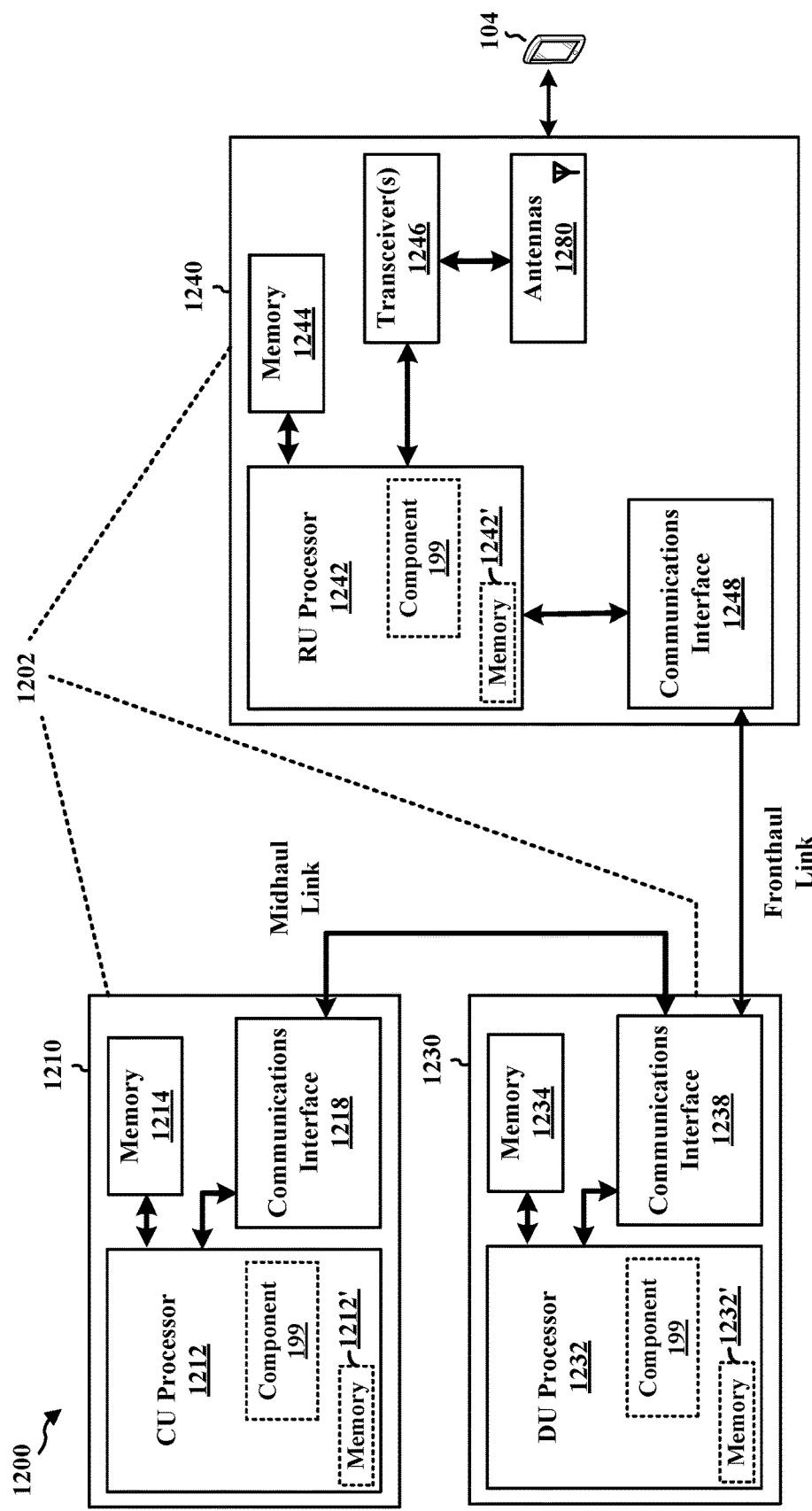
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to identify a single first packet size associated with a plurality of packets. The component 199 may be configured to transmit the plurality of packets to a UE based on a MIRS. Each packet in the plurality of packets may be associated with the single first packet size. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for identifying a single first packet size associated with a plurality of packets. The network entity 1202 includes means for transmitting the plurality of packets to a UE based on a MIRS. Each packet in the plurality of packets may be associated with the single first packet size. In one configuration, each packet in the plurality of packets may include a first number of systematic bits and a second number of parity bits. In one configuration, the first number of systematic bits may be associated with a first cyclic buffer at the network node. The second number of parity bits may be associated with a second cyclic buffer at the network node. In one configuration, the network entity 1202 includes means for receiving an indication of a decrease in reception quality from the UE. The network entity 1202 includes means for transmitting a repetition of a transmission of a slot or a code block associated with the plurality of packets to the UE based on the decrease in the reception quality. In one configuration, the decrease in the reception quality may be based on at least one of an SNR, a channel capacity, an average LLR, or a mutual information. In one configuration, the network entity 1202 includes means for switching, during a first time window, between a plurality of frequency segments for transmission to the UE based on a first frequency hopping scheme. The network entity 1202 includes means for receiving, during the first time window, a plurality of ACK/NACKs from the UE. The network entity 1202 includes means for identifying a second frequency hopping scheme based on statistics associated with the plurality of ACK/NACKs. The network entity 1202 includes means for switching, subsequent to the first time window, between the plurality of frequency segments for transmission to the UE based on the second frequency hopping scheme. In one configuration, a frequency segment in the plurality of frequency segments may be switched to with a higher probability based on the second frequency hopping scheme if the frequency segment is less likely to be associated with NACKs based on the statistics associated with the plurality of ACK/NACKs. In one configuration, the plurality of packets may be associated with a code rate.

The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 5-12, a network node may identify a single first packet size associated with a plurality of packets. The network node may transmit the plurality of packets to a UE based on a MIRS. Each packet in the plurality of packets may be associated with the single first packet size. The UE may decode the plurality of packets based on the MIRS. Accordingly, communication may be performed efficiently in unlicensed bands based on the MIRS technique.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving a plurality of packets from a network node, each packet in the plurality of packets being associated with a single first packet size; and decoding the plurality of packets based on a MIRS.

Aspect 2 is the method of aspect 1, where each packet in the plurality of packets includes a first number of systematic bits and a second number of parity bits.

Aspect 3 is the method of aspect 2, where the first number of systematic bits are associated with a first cyclic buffer at the network node, and the second number of parity bits are associated with a second cyclic buffer at the network node.

Aspect 4 is the method of any of aspects 1 to 3, further including: transmitting an indication of a decrease in reception quality to the network node; and receiving a repetition of a transmission of a slot or a code block associated with the plurality of packets from the network node based on the decrease in the reception quality.

Aspect 5 is the method of aspect 4, where the decrease in the reception quality is identified based on at least one of an SNR, a channel capacity, an average LLR, or a mutual information.

Aspect 6 is the method of any of aspects 1 to 5, where the plurality of packets is associated with a code rate.

Aspect 7 is a method of wireless communication at a network node, including identifying a single first packet size associated with a plurality of packets; and transmitting the plurality of packets to a UE based on a MIRS, each packet in the plurality of packets being associated with the single first packet size.

Aspect 8 is the method of aspect 7, where each packet in the plurality of packets includes a first number of systematic bits and a second number of parity bits.

Aspect 9 is the method of aspect 8, where the first number of systematic bits are associated with a first cyclic buffer at the network node, and the second number of parity bits are associated with a second cyclic buffer at the network node.

Aspect 10 is the method of any of aspects 7 to 9, further including: receiving an indication of a decrease in reception quality from the UE; and transmitting a repetition of a transmission of a slot or a code block associated with the plurality of packets to the UE based on the decrease in the reception quality.

Aspect 11 is the method of aspect 10, where the decrease in the reception quality is based on at least one of an SNR, a channel capacity, an average LLR, or a mutual information.

Aspect 12 is the method of any of aspects 7 to 11, further including: switching, during a first time window, between a plurality of frequency segments for transmission to the UE based on a first frequency hopping scheme; receiving, during the first time window, a plurality of ACK/NACKs from the UE; identifying a second frequency hopping scheme based on statistics associated with the plurality of ACK/NACKs; and switching, subsequent to the first time window, between the plurality of frequency segments for transmission to the UE based on the second frequency hopping scheme.

Aspect 13 is the method of aspect 12, where a frequency segment in the plurality of frequency segments is switched to with a higher probability based on the second frequency hopping scheme if the frequency segment is less likely to be associated with NACKs based on the statistics associated with the plurality of ACK/NACKs.

Aspect 14 is the method of any of aspects 7 to 13, where the plurality of packets is associated with a code rate.

Aspect 15 is an apparatus for wireless communication including at least one processor coupled to a memory and, based at least in part on information stored in the memory, the at least one processor is configured to implement a method as in any of aspects 1 to 14.

Aspect 16 may be combined with aspect 15 and further includes a transceiver coupled to the at least one processor.

Aspect 17 is an apparatus for wireless communication including means for implementing any of aspects 1 to 14.

Aspect 18 is a non-transitory computer-readable storage medium storing computer executable code, where the code when executed by a processor causes the processor to implement any of aspects 1 to 14.

Various aspects have been described herein. These and other aspects are within the scope of the following claims.

What is claimed is:

1. An apparatus for wireless communication at a user equipment (UE), comprising:
   memory; and
   at least one processor coupled to the memory and, based at least in part on information stored in the memory, the at least one processor is configured to:
     receive a plurality of packets from a network node, each packet in the plurality of packets being associated with a single first packet size, wherein each packet in the plurality of packets includes a first number of systematic bits and a second number of parity bits; and
     decode the plurality of packets based on a multiple incremental redundancy scheme (MIRS).

2. The apparatus of claim 1, wherein the first number of systematic bits are associated with a first cyclic buffer at the network node, and the second number of parity bits are associated with a second cyclic buffer at the network node.

3. An apparatus for wireless communication at a user equipment (UE), comprising:
memory; and
at least one processor coupled to the memory and, based at least in part on information stored in the memory, the at least one processor is configured to:
receive a plurality of packets from a network node, each packet in the plurality of packets being associated with a single first packet size;
decode the plurality of packets based on a multiple incremental redundancy scheme (MIRS);
transmit an indication of a decrease in reception quality to the network node; and
receive a repetition of a transmission of a slot or a code block associated with the plurality of packets from the network node based on the decrease in the reception quality.

4. The apparatus of claim 3, wherein the decrease in the reception quality is identified based on at least one of a signal-to-noise ratio (SNR), a channel capacity, an average log-likelihood ratio (LLR), or a mutual information.

5. The apparatus of claim 1, wherein the plurality of packets is associated with a code rate.

6. The apparatus of claim 1, further comprising a transceiver coupled to the at least one processor.

7. A method of wireless communication at a user equipment (UE), comprising:
receiving a plurality of packets from a network node, each packet in the plurality of packets being associated with a single first packet size, wherein each packet in the plurality of packets includes a first number of systematic bits and a second number of parity bits; and
decoding the plurality of packets based on a multiple incremental redundancy scheme (MIRS).

8. The method of claim 7, wherein the first number of systematic bits are associated with a first cyclic buffer at the network node, and the second number of parity bits are associated with a second cyclic buffer at the network node.

9. The method of claim 7, further comprising:
transmitting an indication of a decrease in reception quality to the network node; and
receiving a repetition of a transmission of a slot or a code block associated with the plurality of packets from the network node based on the decrease in the reception quality.

10. The method of claim 9, wherein the decrease in the reception quality is identified based on at least one of a signal-to-noise ratio (SNR), a channel capacity, an average log-likelihood ratio (LLR), or a mutual information.

11. The method of claim 7, wherein the plurality of packets is associated with a code rate.

12. An apparatus for wireless communication at a network node, comprising:
memory; and
at least one processor coupled to the memory and, based at least in part on information stored in the memory, the at least one processor is configured to:
identify a single first packet size associated with a plurality of packets;
transmit the plurality of packets to a user equipment (UE) based on a multiple incremental redundancy scheme (MIRS), each packet in the plurality of packets being associated with the single first packet size;
switch, during a first time window, between a plurality of frequency segments for transmission to the UE based on a first frequency hopping scheme;
receive, during the first time window, a plurality of acknowledgements (ACKs) or negative ACKs (NACKs) (ACK/NACKs) from the UE;
identify a second frequency hopping scheme based on statistics associated with the plurality of ACK/NACKs; and
switch, subsequent to the first time window, between the plurality of frequency segments for transmission to the UE based on the second frequency hopping scheme.

13. The apparatus of claim 12, wherein each packet in the plurality of packets includes a first number of systematic bits and a second number of parity bits.

14. The apparatus of claim 13, wherein the first number of systematic bits are associated with a first cyclic buffer at the network node, and the second number of parity bits are associated with a second cyclic buffer at the network node.

15. The apparatus of claim 12, the at least one processor being further configured to:
receive an indication of a decrease in reception quality from the UE; and
transmit a repetition of a transmission of a slot or a code block associated with the plurality of packets to the UE based on the decrease in the reception quality.

16. The apparatus of claim 15, wherein the decrease in the reception quality is based on at least one of a signal-to-noise ratio (SNR), a channel capacity, an average log-likelihood ratio (LLR), or a mutual information.

17. The apparatus of claim 12, wherein a frequency segment in the plurality of frequency segments is switched to with a higher probability based on the second frequency hopping scheme if the frequency segment is less likely to be associated with NACKs based on the statistics associated with the plurality of ACK/NACKs.

18. The apparatus of claim 12, wherein the plurality of packets is associated with a code rate.

19. The apparatus of claim 12, further comprising a transceiver coupled to the at least one processor.

* * * * *